US012596703B1

(12) United States Patent
Browder et al.

(10) Patent No.: US 12,596,703 B1
(45) Date of Patent: Apr. 7, 2026

(54) APPARATUS AND METHOD FOR ADAPTIVE DATA CONVERSION

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/963,603

(22) Filed: Nov. 28, 2024

(51) Int. Cl.
G06F 16/23       (2019.01)
G06F 16/25       (2019.01)
G06Q 40/08       (2012.01)

(52) U.S. Cl.
CPC ........ G06F 16/2365 (2019.01); G06F 16/254 (2019.01); G06Q 40/0841 (2025.08)

(58) Field of Classification Search
None
See application file for complete search history.

(56) References Cited

U.S. PATENT DOCUMENTS

| | | | |
|---|---|---|---|
| 8,073,709 B2 | 12/2011 | Moreno et al. | |
| 11,269,911 B1 * | 3/2022 | Jones ................... | G06F 16/254 |
| 11,600,391 B1 | 3/2023 | Rodriques-Craig | |
| 11,978,027 B2 | 5/2024 | Hummer | |
| 2008/0040231 A1 | 2/2008 | Hunt et al. | |

| | | | |
|---|---|---|---|
| 2022/0374442 A1 * | 11/2022 | Kaspa ...................... | G06N 5/04 |
| 2024/0281747 A1 * | 8/2024 | Chapman .............. | G06F 16/906 |
| 2024/0362194 A1 * | 10/2024 | Roberts ............... | G06F 16/2379 |
| 2024/0370771 A1 * | 11/2024 | Smith .............. | G06Q 10/06393 |

FOREIGN PATENT DOCUMENTS

IN      202411043572 A      6/2024

OTHER PUBLICATIONS

Goldstein, Ira, "Automated Classification of the Narrative of Medical Reports Using Natural Language Processing", 2011 Dissertation, University at Albany, State University of New York, 205 pages. (Year: 2011).*
Theobald, Oliver, "Machine Learning for Beginners: A Plain English Introduction", 2021, Scatter Plot Press, 3rd ed., 169 pages. (Year: 2021).*
Suzanne Delzlo, Healthcare Chargemaster: Strengthen Your Pricing Foundation to Optimize Revenue, "MD Clarity blog Published: Sep. 11, 2024".

(Continued)

*Primary Examiner* — Scott A. Waldron
(74) *Attorney, Agent, or Firm* — CALDWELL LLC

(57)       ABSTRACT

An apparatus and method for adaptive data conversion are disclosed. The apparatus includes a memory communicatively connected to at least a processor, wherein the memory contains instructions configuring the at least a processor to access an interactive data structure including a plurality of input elements in a plurality of first formats, identify an input attribute of each of the plurality of input elements, convert each of the plurality of input elements in the plurality of first formats to a second format as a function of the input attribute, generate output data as a function of the plurality of input elements in the second format, and update the interactive data structure as a function of the output data.

16 Claims, 7 Drawing Sheets

(56) References Cited

OTHER PUBLICATIONS

Bridget K. Burke, Using Artificial Intelligence to Improve Health-care Clinical and Financial Systems, Aug. 13, 2023 | Articles, Technology.
Leveraging Al and Machine Learning for Efficient Medical Billing "Published By—Medical Billers and CodersPublished Date—May 22, 2024".

* cited by examiner

605 Assessing an Interactive Data Structure

610 Identifying an Input Attribute

615 Converting Each of a Plurality of Input Elements

620 Generating Output Data

625 Updating the Interactive Data Structure

600

APPARATUS AND METHOD FOR ADAPTIVE DATA CONVERSION

FIELD OF THE INVENTION

The present invention generally relates to the field of data conversion. In particular, the present invention is directed to an apparatus and method for adaptive data conversion.

BACKGROUND

In today's data-driven environment, vast amounts of information are generated, stored, and exchanged across a multitude of systems and platforms. These systems often represent data in various formats tailored to their specific requirements, making data conversion a critical function for interoperability, data analysis, and information management. Historically, data conversion has relied on manual mapping and rigid rule-based processes that require significant customization for each pair of data formats. The increasing demand for automation and real-time data conversion has led to the need for the development of advanced techniques.

SUMMARY OF THE DISCLOSURE

In an aspect, an apparatus for adaptive data conversion is disclosed. The apparatus includes at least a processor and a memory communicatively connected to the at least a processor, wherein the memory contains instructions configuring the at least a processor to access an interactive data structure including a plurality of input elements in a plurality of first formats, identify an input attribute of each of the plurality of input elements, convert each of the plurality of input elements in the plurality of first formats to a second format as a function of the input attribute, wherein converting each of the plurality of input elements includes selecting one conversion pathway from a plurality of conversion pathways for each of the plurality of input elements as a function of the input attribute and the plurality of first formats, wherein the conversion pathway includes a format specific conversion sequence and converting the plurality of input elements using the selected conversion pathway, generate output data as a function of the plurality of input elements in the second format, wherein generating the output data includes generating output training data, wherein the output training data includes historical output data, training an output machine-learning model using the output training data and generating the output data using the trained output machine-learning model and update the interactive data structure as a function of the output data.

In another aspect, a method for adaptive data conversion is disclosed. The method includes accessing, using at least a processor, an interactive data structure including a plurality of input elements in a plurality of first formats, identifying, using the at least a processor, an input attribute of each of the plurality of input elements, converting, using the at least a processor, each of the plurality of input elements in the plurality of first formats to a second format as a function of the input attribute, wherein converting each of the plurality of input elements includes selecting one conversion pathway from a plurality of conversion pathways for each of the plurality of input elements as a function of the input attribute and the plurality of first formats, wherein the conversion pathway includes a format specific conversion sequence and converting the plurality of input elements using the selected conversion pathway, generating, using the at least a processor, output data as a function of the plurality of input elements in the second format, wherein generating the output data includes generating output training data, wherein the output training data includes historical output data, training an output machine-learning model using the output training data and generating the output data using the trained output machine-learning model and updating, using the at least a processor, the interactive data structure as a function of the output data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to apparatuses and methods for adaptive data conversion are disclosed. The apparatus includes at least a processor and a memory communicatively connected to the at least a processor, wherein the memory contains instructions configuring the at least a processor to access an interactive data structure including a plurality of input elements in a plurality of first formats, identify an input attribute of each of the plurality of input elements, convert each of the plurality of input elements in the plurality of first formats to a second format as a function of the input attribute, wherein converting each of the plurality of input elements includes selecting one conversion pathway from a plurality of conversion pathways for each of the plurality of input elements as a function of the input attribute and the plurality of first formats, wherein the conversion pathway includes a format specific conversion sequence and converting the plurality of input elements using the selected conversion pathway, generate output data as a function of the plurality of input elements in the second format, wherein generating the output data includes generating output training data, wherein the output training data includes historical output data, training an output machine-learning model using the output training data and generating the output data using the trained output machine-learning model and update the interactive data structure as a function of the output data.

Aspects of the present disclosure can be used to convert data from one format to another. Aspects of the present disclosure can also be used to generate appropriate pricing for billable items.

Exemplary embodiments illustrating aspects of the present disclosure are described below in the context of several specific examples.

Figure 1:
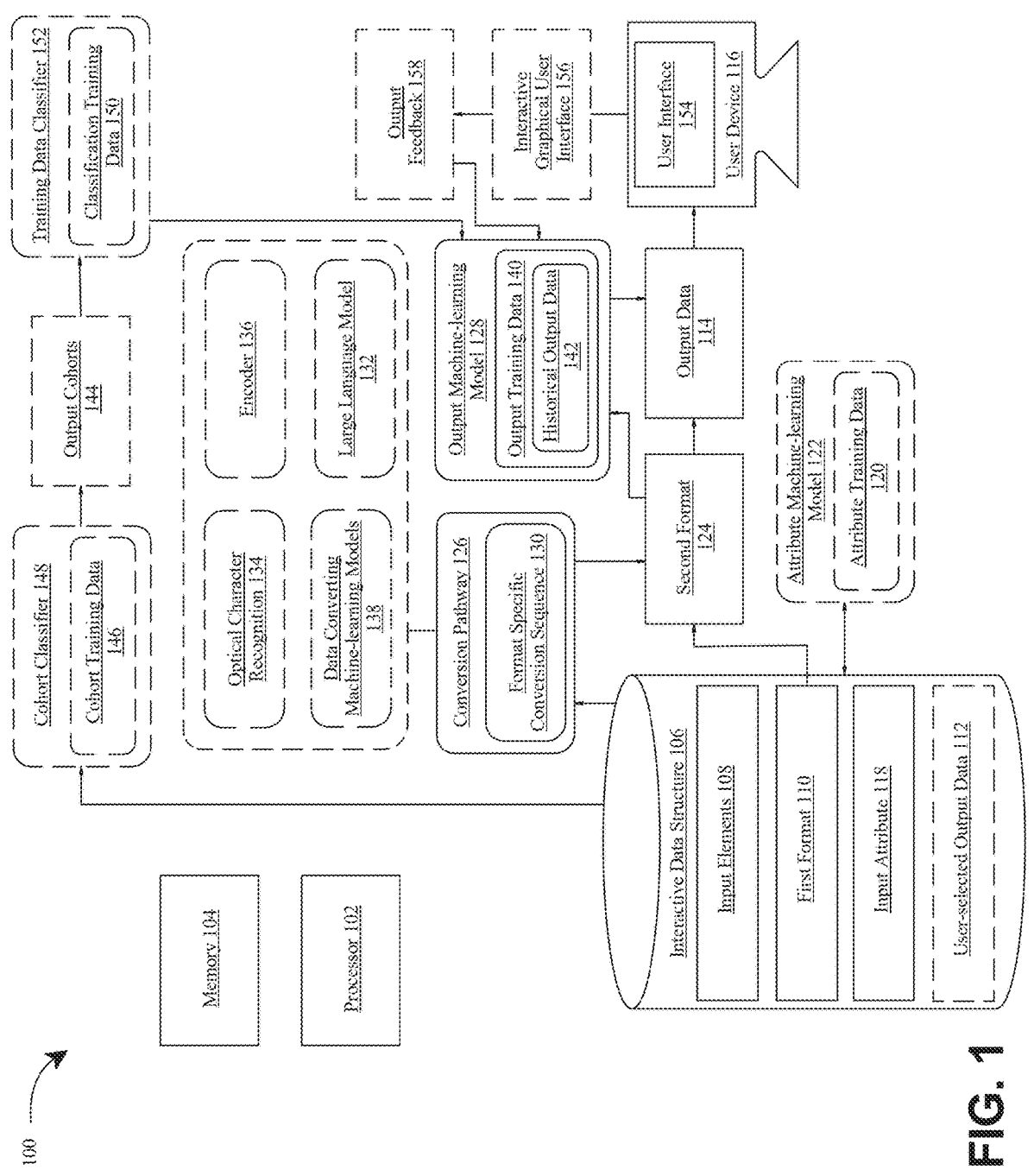
FIG. 1 illustrates a block diagram of an exemplary apparatus for adaptive data conversion.

Referring now to FIG. 1, an exemplary embodiment of an apparatus 100 for adaptive data conversion is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 contains instructions configuring processor 102 to access an interactive data structure 106. For the purposes of this disclosure, an "interactive data structure" a structured organization of a plurality of input elements. Interactive data structure 106 includes a plurality of input elements 108 in a plurality of first formats 110. For the purposes of this disclosure, an "input element" is an individual unit of data or data structure within the interactive data structure that the processor can interact with or process. In some embodiments, input element 108 may include information, variables, or values to be used in the data processing. As a non-limiting example, input element 108 may include a single field (e.g., a text entry, numeric value, or date), a structure (e.g., an array or an object), data entity (e.g., a JSON object or XML node), and the like. As a non-limiting example, interactive data structure 106 may include database fields, JSON keys, XML tags, or entries in a form where each field represents an individual input element 108. As another non-limiting example, input element 108 may include image data. For instance, and without limitation, input element 108 may include image or video of a billable item. In some embodiments, input element 108 may include information related to a facility. For the purposes of this disclosure, a "facility" is a physical location or building. As a non-limiting example, a facility may include hospital, factory, health care center, behavioral health center, and the like. For example, and without limitation, input element 108 may include information related to billable items for a hospital patient's insurance provider. For the purposes of this disclosure, a "billable item" refers to any service, product, or procedure that generates a charge payable by a patient's insurance provider. As a non-limiting example, billable items may include hospital room charges, procedures, diagnostic tests, medications, rehabilitation services, physician consultations, equipment rentals, and the like. In some embodiments, plurality of input elements 108 may include user-selected output data 112 associated with each of the plurality of input elements 108. For the purposes of this disclosure, "user-selected output data" is output data that is inputted by a user. For the purposes of this disclosure, a "user" is a person or entity that has used an apparatus 100. The output data 114 disclosed herein is further described in detail below.

With continued reference to FIG. 1, for the purposes of this disclosure, a "first format" is an original format or structure in which each input element exists before any processing or transformation takes place. As a non-limiting example, first format 110 may include texts, images, audio, video, unstructured data or structured data. For example, and without limitation, first format 110 of first input element 108 may include 'element one.' As another non-limiting example, first format 110 may include a specific sequence or structure of input elements 108, and the like. For example, and without limitation, first format 110 of a date (input element 108) may be MM/DD/YYYY.

In some embodiments, interactive data structure 106 may include a chargemaster. A "chargemaster," for the purposes of this disclosure is a listing of rates charged by a medical institution. Chargemaster may include a comprehensive listing of items billable to a patient or to an insurance company. In some embodiments, prices may be optimized to ensure the greatest reimbursement from the insurance company.

With continued reference to FIG. 1, in some embodiments, interactive data structure 106 may include a database. In one or more embodiments, database may include inputted or calculated information and datum related to input element 108. In some embodiments, a datum history may be stored in database. As a non-limiting example, the datum history may include real-time and/or previous inputted data related to input element 108. As a non-limiting example, database may include instructions from a user, who may be an expert user, a past user in embodiments disclosed herein, or the like, where the instructions may include examples of the data related to input element 108.

With continued reference to FIG. 1, in some embodiments, processor 102 may be communicatively connected with database. For example, and without limitation, in some cases, database may be local to processor 102. In another example, and without limitation, database may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store database. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, for the purposes of this disclosure, a "user device" is any device a user use to input data. As a non-limiting example, user device 116 may include a laptop, desktop, tablet, mobile phone, smart phone, smart watch, kiosk, screen, smart headset, or things of the like. In some embodiments, user device 116 may include an interface configured to receive inputs from a user. In some embodiments, user may manually input any data into apparatus 100 using user device 116. In some embodiments, user may have a capability to process, store or transmit any information independently. In some embodiments, user may input a plurality of input elements 108 into processor 102 using user device 116.

With continued reference to FIG. 1, memory 104 contains instructions configuring processor 102 to extract an input attribute 118 of each of a plurality of input elements 108. For the purposes of this disclosure, an "attribute" is a characteristic of input data. In some embodiments, input attribute 118 may include a data type. As a non-limiting example, input attribute 118 may include a data type such as text, number, date/time, and the like. As another non-limiting example, input attribute 118 may include category (e.g., item codes, department names, context, medications, procedures) As another non-limiting example, input attribute 118 may include visual features (e.g., shapes, colors, patterns, edges), and the like. As another non-limiting example, input attribute 118 may include context of input elements 108. In some embodiments, processor 102 may retrieve input attribute 118 from database. In some embodiments, user may manually input an input attribute 118.

With continued reference to FIG. 1, in some embodiments, extracting a plurality of input attribute 118 may include extracting image-based attributes of a plurality of input attribute 118 from image data of input element 108 using a machine vision module. For the purposes of this disclosure, an "image-based attribute" is a feature, property, or data point that is extracted from image data. As a non-limiting example, image-based attribute may include patterns, edges, contours, shapes, textures, and the like. For example, and without limitation, image-based attribute may include a label of an image of billable items. For the purposes of this disclosure, a "label" of image data is a descriptive identifier of an image. As a non-limiting example, if an image is related to a diagnostic test, then a label of the image may be a name of the diagnostic test.

With continued reference to FIG. 1, in some embodiments, processor 102 may be configured to analyze input element 108 using machine vision module to extract image-based attributes. For the purposes of this disclosure, a "machine vision module" is a type of technology that enables a computing device to inspect, evaluate and identify still or moving images. For example, in some cases a machine vision module may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, alternatively or additionally, identifying image-based attribute may include classifying an image-based attribute or input element 108 to a label of the image-based attribute using an image classifier; the image classifier may be trained using a plurality of images and labels of image-based attributes. The image classifier may be configured to determine which of a plurality of edge-detected shapes is closest to an image-based attributes as determined by training using training data and selecting the determined shape as the image-based attribute. As a non-limiting example, the image classifier may be trained with image training data that correlates the plurality of images of image-based attributes to a label of the image-based attributes. Alternatively, identification of the image-based attribute may be performed without using computer vision and/or classification; for instance, identifying the image-based attribute may further include receiving, from a user, an identification of the image-based attribute in an image (image data).

With continued reference to FIG. 1, in some embodiments, extracting a plurality of input attribute 118 may include extracting text-based attributes of input attribute 118 from image data of input element 108 using an optical character recognition. For the purposes of this disclosure, a "text-based attribute" is a characteristic that consists of text. As a non-limiting example, text-based attribute may include textual information, such as names, dates, addresses, identification numbers, medical terms, keywords, or labels. For example, and without limitation, an image of a document (image data) may contain at text-based attribute like detected words, paragraphs, table structures, or logos. As another non-limiting example, text-based attribute may include numerical values, such as prices, measurements, quantities, coordinates, or time stamps.

With continued reference to FIG. 1, in some embodiments, processor 102 may be configured to generate attribute training data 120. In a non-limiting example, attribute training data 120 may include exemplary input elements correlated to exemplary input attributes. In some embodiments, attribute training data 120 may be stored in database. In some embodiments, attribute training data 120 may be received from one or more users, database, external computing devices, and/or previous iterations of processing. As a non-limiting example, attribute training data 120 may include instructions from a user, who may be an expert user, a past user in embodiments disclosed herein, or the like, which may be stored in memory and/or stored in database, where the instructions may include labeling of training examples. In some embodiments, attribute training data 120 may be updated iteratively on a feedback loop. As a non-limiting example, processor 102 may update attribute training data 120 iteratively through a feedback loop as a function of input element 108, output of machine vision module, optical character recognition, or the like. In some embodiments, processor 102 may be configured to generate attribute machine-learning model 122. In a non-limiting example, generating attribute machine-learning model 122 may include training, retraining, or fine-tuning attribute machine-learning model 122 using attribute training data 120 or updated attribute training data 120. In some embodiments, processor 102 may be configured to extract input attribute 118 from input element 108 using attribute machine-learning model 122 (i.e. trained or updated attribute machine-learning model 122). In some embodiments, generating training data and training machine-learning models may be simultaneous.

With continued reference to FIG. 1, memory 104 contains instructions configuring processor 102 to convert each of a plurality of input elements 108 in a plurality of first formats 110 to a second format 124 as a function of input attribute 118. For the purposes of this disclosure, a "second format" is a format or structure in which each input element has after any processing or transformation. As a non-limiting example, second format 124 may include texts, images, audio, video, unstructured data or structured data. For example, and without limitation, second format 124 of an input element 108 may include 'Code 1' while first format 110 of the input element 108 may include 'element one.' As another non-limiting example, second format 124 may include a specific sequence or structure of input elements 108, and the like. For example, and without limitation, second format 124 of a date may be YYYY/MM/DD while first format 110 of a date (input element 108) may be MM/DD/YYYY. In some embodiments, converting input elements 108 in first format 110 to second format 124 may include converting input element 108 (e.g., image-based attributes) in first format 110 into machine-readable data (second format 124). For the purposes of this disclosure, "machine-readable data" data that is structured and formatted in a way that can be processed, interpreted, and used by a computer. As a non-limiting example, machine-readable data may include various formats, such as JSON, XML, CSV, binary formats, and the like. Second format 124 may be consistent with code that is described in U.S. Nonprovisional patent application Ser. No. 18/957,811, filed on Nov. 24, 2024, and titled "APPARATUS AND METHOD FOR DETERMINING A CODE AS A FUNCTION OF SUBJECT DATA," the entirety of which is incorporated as a reference.

Still referring to FIG. 1, in some embodiments, input element 108 may be converted into a different form (second format 124). Data formats may be converted in a variety of ways, such as without limitation, using a speech to text function or using optical character recognition. In some embodiments, input element 108 may be converted into a different form (second format 124) such that it is in a form appropriate for input into a function. As a non-limiting example, a conversion pathway 126 and/or output machine-learning model 128 may only accept inputs in a particular format, and input element 108 may be converted into that format such that it may be effectively input into conversion pathway 126 and/or output machine-learning model 128.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word.

With continued reference to FIG. 1, converting each of a plurality of input elements 108 includes selecting one conversion pathway 126 from a plurality of conversion pathways 126 for each of the plurality of input elements 108 as a function of an input attribute 118 and a plurality of first formats 110 and converting the plurality of input elements 108 using the selected conversion pathway 126. For the purposes of this disclosure, a "conversion pathway" is a structured process or sequence of steps used to transform data from one format into another. In some embodiments, conversion pathway may include various stages for interpreting, mapping, transforming, and validating input elements 108 so that it aligns with a target format (second format 124). In some embodiments, conversion pathway 126 may be selected or adapted by processor 102 based on the characteristics of the input elements 108, such as its type, structure, or complexity (input attribute 118). For example, and without limitation, processor 102 may convert medical records stored in XML to a JSON format using conversion pathway 126 that includes identifying XML elements, mapping them to JSON fields, restructuring nested data, and handling format-specific adjustments, such as converting dates or numeric values to align with JSON standards. For instance, and without limitation, if processor 102 converts input element 108 from a relational database format to JSON, date fields in interactive data structure 106 may be converted from a YYYY-MM-DD format to an MM-DD-YYYY format in JSON. For another example, and without limitation, Boolean values stored as 0 and 1 in a CSV may be converted to true and false in a JSON format.

With continued reference to FIG. 1, conversion pathway 126 includes a format specific conversion sequence 130. For the purposes of this disclosure, a "format-specific conversion sequence" is a format-dependent steps within a conversion pathway. In a non-limiting example, format specific conversion sequence 130 may include optical character recognition, language processing module and large language model 132 for input elements 108 with text-based attribute. In another non-limiting example, format specific conversion sequence 130 may include image processing algorithms, feature extraction modules, and neural network-based classifiers for input elements 108 with image-based attributes. In another non-limiting example, format specific conversion sequence 130 may include data normalization steps, unit conversion algorithms, and statistical validation checks for input elements 108 with numerical or quantitative attributes. In another non-limiting example, format specific conversion sequence 130 may include temporal alignment methods, interpolation for missing values, and Fourier transformation for input elements 108 that includes time-series data.

With continued reference to FIG. 1, in some embodiments, processor 102 may use a language processing module to find input attribute 118, association between keywords, and the like. The language processing module may be configured to extract, from input elements 108, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, abbreviations, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIG. 1, language processing module may operate to produce a language processing model. Language processing model may include a program automatically generated by processor 102 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator May be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents or input elements 108 and determine that the one or more documents or input elements 108 indicate significance of a category. In an embodiment, language module and/or processor 102 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 102. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 102 may automatically obtain the document using such an identifier, for instance by submitting a request to a database or compendium of documents such as JSTOR as provided by Ithaka Harbors, Inc. of New York.

With continued reference to FIG. 1, in some embodiments, conversion pathway 126 may include optical character recognition (OCR). For the purposes of this disclosure, "optical character recognition" is a technology that enables the recognition and conversion of printed or written text into machine-encoded text. In some cases, the at least a processor 102 may be configured to recognize a keyword using OCR to find keywords. As used in this disclosure, a "keyword" is an element of word or syntax used to identify and/or match elements to each other. In some cases, the at least a processor 102 may transcribe much or even substantially all input element 108.

With continued reference to FIG. 1, in some embodiments, optical character recognition or optical character reader (OCR) 134 may include automatic conversion of images of written (e.g., typed, handwritten or printed text) into machine-encoded text. In some cases, recognition of a keyword from input element 108 may include one or more processes, including without limitation optical character recognition (OCR) 134, optical word recognition, intelligent character recognition, intelligent word recognition, and the like. In some cases, OCR 134 may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR 134 may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR 134 processes may employ pre-processing of input element 108. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the input element 108 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR 134 process may include an OCR 134 algorithm. Exemplary OCR 134 algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR 134 process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR 134. In some embodiments, machine-learning processes like nearest neighbor classifiers (e.g., k-nearest neighbors algorithm) may be used to compare image features with stored glyph features and choose a nearest match. OCR 134 may employ any machine-learning process described in this disclosure, for example machine-learning processes described with reference to FIG. 5. Exemplary non-limiting OCR software may include Cuneiform and Tesseract. Cuneiform may include a multi-language, open-source optical character recognition system originally developed by Cognitive Technologies of Moscow, Russia. Tesseract may include free OCR 134 software originally developed by Hewlett-Packard of Palo Alto, California, United States.

With continued reference to FIG. 1, in some cases, OCR 134 may employ a two-pass approach to character recognition. A first pass may try to recognize a character. Each character that is satisfactory may be passed to an adaptive classifier as training data. The adaptive classifier then may get a chance to recognize characters more accurately as it further analyzes input element 108. Since the adaptive classifier may have learned something useful a little too late to recognize characters on the first pass, a second pass may be run over the input element 108. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR 134 software may employ neural networks.

With continued reference to FIG. 1, in some cases, OCR 134 may include post-processing. For example, OCR 134 accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR 134 process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, conversion pathway 126 or format specific conversion sequence 130 may include large language model (LLM) 132. In some embodiments, processor 102 may convert input element 108 in first format 110 to second format 124 using LLM 132. In some embodiments, large language model 132 may receive an output of optical character recognition 134 and/or language processing module as an input. A "large language model," as used herein, is a deep learning algorithm that can recognize, summarize, translate, predict and/or generate text and other content based on knowledge gained from massive datasets. LLM 132 may be a type of generative artificial intelligence (AI). LLMs 132 may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs 132, in some embodiments, may include GPT, GPT-2, GPT-3, and other language processing models. LLM 132 may be used to augment the text in an article based on a prompt. Training data may correlate elements of a dictionary related to linguistics, as described above, to a prompt. LLM 132 may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM 132 may output such predictions by ranking words by likelihood or a prompt parameter. For the example given above, the LLM 132 may score "you" as the most likely, "your" as the next most likely, "his" or "her" next, and the like.

Still referring to FIG. 1, LLM 132 may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM 132 may predict the next word by searching for a set of position in a source sentence where the most relevant information is concentrated. LLM 132 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM 132 may include encoder-decoder model incorporating an attention mechanism.

Still referring to FIG. 1, LLM 132 may include a transformer architecture. In some embodiments, encoder component of LLM 132 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 132 may predict the next word by searching for a set of position in a source sentence where the most relevant information is concentrated. LLM 132 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM 132, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 132 may pick up particular parts at different positions in the input sequence and over time compute an initial composition of the output sequence. In multi-head attention, LLM 132 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 132 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 132 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 132 may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM 132 may learn to associate the word "you", with "how" and "are". It's also possible that LLM 132 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM 132 to learn to extract and focus on different combinations of attention from its attention heads.

With continued reference to FIG. 1, in some embodiments, LLM 132 may be specifically trained using large language model (LLM) training data. In some embodiments, LLM training data may include correlations between exemplary directed graphs and exemplary linguistic terms. LLM training data may include correlations between texts in first formats and second formats. In some embodiments, LLM training data may include a set of data that is in user's voice, email, website, or the like to mimic them. In some embodiments, LLM training data may be consistent with any training data described in the entirety of this disclosure. In some embodiments, LLM training data may be received from one or more users, database, external computing devices, and/or previous iterations of processing. As a non-limiting example, LLM training data may include instructions from a user, who may be an expert user, a past user in embodiments disclosed herein, or the like, which may be stored in memory and/or stored in database, where the instructions may include labeling of training examples. In some embodiments, LLM training data may be updated iteratively through a feedback loop. As a non-limiting example, LLM training data may be updated iteratively through a feedback loop as a function of newly collected input element 108, input attribute 118, output of machine-learning models described herein, or the like. In some embodiments, processor 102 may be configured to generate LLM 132. In a non-limiting example, generating LLM 132 may include training, retraining, or fine-tuning LLM 132 using LLM training data or updated LLM training data. In some embodiments, processor 102 may be configured to generate input element 108 in second format 124 using LLM 132 (i.e. trained or updated LLM 132).

With continued reference to FIG. 1, in some embodiments, conversion pathway 126 and/or format specific conversion sequence 130 may include an encoder 136. For the purposes of this disclosure, an "encoder" is a component or system that transforms input data from texts into a numerical representation or vector format. In some embodiments, encoder 136 may include recurrent neural network (RNN) encoder, long short-term memory (LSTM) encoder, transformer encoder, autoencoder, and the like. For the purposes of this disclosure, "encoding" refers to a process of transforming data from one format or structure into another. Encoder 136 may be configured to convert each input element 108 in first format 110 into second format 124. For example, and without limitation, processor 102 may input 'fire extinguisher' (first format 110) into an encoder 136 and output [0.2, −0.3, 0.5, 0.7, . . . , −0.1] (second format 124). In some embodiments, user may manually convert input element 108 in first format 110 to second format 124.

With continued reference to FIG. 1, in some embodiments, conversion pathway 126 and/or format specific conversion sequence 130 may include bidirectional encoder representations from transformers (BERT). In some embodiments, encoder 136 may include BERT. In an embodiment, BERT may implement a transformer architecture having an "attention mechanism" configured to dynamically determine and assign weight e.g., importance of different tokens such as text characters, words, nucleotides, kmers, or the like. Exemplary attention mechanism may include, without limitation, generalized attention self-attention, multi-head attention, additive attention, global attention, and the like. In some cases, transformer architecture may be implemented as an encoder-decoder structure having an encoder configured to map an input sequence to a higher dimensional space i.e., a sequence of continuous representations, and a decoder configured to transform output of the encoder into a final output sequence, such as without limitation an embedding representing a nucleotide sequence. In other cases, transformer architecture may include only an encoder stack. As a non-limiting example, BERT may include a plurality of layers each contains one or more sub-layers, wherein a first sub-layer may include a multi-head self-attention mechanism, and a second sub-layer May include a position-wise fully connected feed-forward network. In some cases, plurality of layers may be identical. In some cases, multi-head self-attention mechanism may configure BERT to focus on different parts of the input sequence when predicting elements of an embedding to be output; for instance, and without limitation, self-attention mechanism may be described by an attention function:

$$\text{Attention }(Q, K, V) = \text{softmax}\left(\frac{QK^T}{\sqrt{d_k}}\right)V$$

Where Q, K, and V represent a set of queries, keys, and values matrices respectively, and $d_k$ is the dimensionality of the keys. In a non-limiting embodiment, in the context of analysis of RNA, a self-attention mechanism may take output of previous layer X and produce outputs C, using weight matrices $$W_i^V$$

based on query matrix $$Q_i = [q_1^i, \ldots, q_n^i],$$

key matrix $$K_i = [k_1^i, \ldots, k_n^i],$$

and value matrix $$V_i \cdot = [v_1^i, \ldots, v_n^i]$$

as follows:

$$C = \text{Concat } (\text{head}_1, \ldots, \text{head}_H) W^o (\text{inner product with the } W \text{ one})$$

$$\text{head}_i = \text{softmax}\left(\frac{(Q_i)(K_i)^T}{\sqrt{D}}\right) V_i$$

where $$Q_i = XW_i^Q, K_i = XW_i^K, V_i = XW_i^V$$

representing inner products with sets of weights $$W_i^Q, W_i^K, \text{ and } W_i^V,$$

which are the weights to be tuned when training BERT. These matrices may be of size D×D that where D is the input and output vector dimension, which may be, as a non-limiting example, 120 elements. In the above-described example, each head may calculate a subsequent hidden state by computing an attention-weighted sum of a value vector v.

In some cases, and still referring to FIG. 1, position-wise fully connected feed-forward network within second sub-layer of each layer may apply a linear transformation to each position separately and identically, for example, and without limitation, position-wise fully connected feed-forward network may be configured to process the output of the attention mechanism according to equation FFN(x)=max(0, $xW_1+b_1)W_2+b_2$, where $W_1$, $W_2$, $b_1$, and $b_2$ are parameters of the feed-forward and x is the input to the feed-forward network. In other words, second sub-layer may include two convolutions with a kernel size 1 and a ReLu activation in between.

With continued reference to FIG. 1, in one or more embodiments, BERT's input representation may combine a plurality of embeddings of tokens, segments, and/or positions. In some cases, each token may be processed, for example and without limitation, through a WordPiece tokenization. Output of BERT may include a fixed-length vector that represents the input token's contextual relationships that suitable for downstream tasks, such as, without limitation, processes describe above. In some cases, implementing BERT for generation of representations of may include pre-training (bidirectionally) which involves one or more unsupervised tasks; for instance, and without limitation, processor 102 may be configured to execute a Masked Language Model (MLM) and a Next Sentence Prediction (NSP). In a non-limiting example, at least a portion of nucleotide sequence in each nucleotide sequence example may be randomly masked, and the model may learn to predict masked nucleotide sequence portions based on the context. NSP may train the model to predict, for example, and without limitation, whether two given subsequences logically follow each other. Additionally, BERT may be fine-tuned to adapt pre-trained representations. In some cases, fine-tuning BERT may include iteratively training BERT's parameters on structural alignment learning and/or masked language model learning with minimal adjustments required from the pre-trained model as described above; for instance, and without limitation, a loss function used for fine-turning may be represented as:

$$L = -\log\left(\frac{e^{s(correct)}}{\sum_j^n e^{s(j)}}\right)$$

Wherein L is the loss, s(correct) is the score of the correct label, and s(j) is the score of each possible label. It should be noted that other exemplary downstream tasks e.g., sentiment analysis, question answering, named entity recognition (NER), among others may be adapted and optimized based on the apparatus and methods described in this disclosure. As a person skilled in the art, upon reviewing the entirety of this disclosure, will be well versed in the model architectures, including multi-head self-attention mechanism and position-wise fully connected feed-forward network as described herein.

With continued reference to FIG. 1, in some embodiments, processor 102 may include reformatting input element 108, translating input element 108 into a different coding scheme, or applying other data converting techniques. In some embodiments, processor 102 may be configured to ensure that input element 108 can be converted to output data 114 and used to support various business processes or analytical activities. In some embodiments, processor 102 may be configured to ensure that input element 108 can be effectively integrated into one format to another format and used to support various business processes or analytical activities. The process of data converting may include several steps, including data cleaning, data mapping, and data loading.

With continued reference to FIG. 1, in some embodiments, processor 102 may be configured for data cleaning (a step within conversion pathway 126). For the purposes of this disclosure, "data cleaning" is the process of identifying and correcting or removing errors and inconsistencies in data. In some embodiments, data cleaning may include analyzing input element 108 to identify any missing or incomplete values, outliers, or inconsistencies. As a non-limiting example, processor 102 may include predefined validation rules that check for common data errors or inconsistencies, such as formatting errors, invalid values, or out-of-range values. As another non-limiting example, processor 102 may include statistical analysis that may detect outliers, unusual patterns or trends, or inconsistencies in the data. In some cases, processor 102 may flag the missing data and prompt a user to input the necessary information. In other cases, processor 102 may infer the missing data based on other available information or use statistical techniques to estimate the missing values. As a non-limiting example, the statistical techniques may include mean imputation, regression imputations, k-nearest neighbor imputation, expectation-maximization (EM) algorithm, or the like. In some cases, processor 102 may exclude the data with missing values from analysis altogether to generate output data 114. In some embodiments, data cleaning may include removing duplicates, correcting spelling mistakes and formatting input element 108 in a consistent manner. In some embodiments, data cleaning may include checking input element 108 for accuracy and consistency, such as checking that all values fall within a specified range.

With continued reference to FIG. 1, in some embodiments, conversion pathway 126 may include data mapping. For the purposes of this disclosure, "data mapping" is the process of defining the relationships between data elements in different entities. In some embodiments, data mapping may include mapping fields, defining the data types and formats to be used, and identifying any transformations or conversions that are necessary. In some embodiments, processor 102 may include data enrichment. For the purposes of this disclosure, "data enrichment" is adding additional data into system data. In some embodiments, the data enrichment may include collecting and analyzing additional data from various sources, such as social media, news articles, or demographic information, and integrating it with output data 114 to create a more comprehensive dataset. As a non-limiting example, the data enrichment may include adding geographic data or demographic data.

With continued reference to FIG. 1, in some embodiments, conversion pathway 126 and/or format specific conversion sequence 130 may include a plurality of data converting machine-learning models 138. For the purposes of this disclosure, a "data converting machine-learning model" is a machine-learning model that converts data from one format to another. In some embodiments, a second 'data converting machine-learning model' may receive an output of a first 'data converting machine-learning model' as an input. As a non-limiting example, first 'data converting machine-learning model' may perform sentiment analysis to determine emotional tone of text, and then pass the output to the second 'data converting machine-learning model,' which may perform language translation on texts, converting input elements from one language to another. In some embodiments, processor 102 may be configured to generate data conversion training data. In a non-limiting example, data conversion training data may include correlations between input elements in first formats and second formats. In some embodiments, data conversion training data may be stored in database. In some embodiments, data conversion training data may be received from one or more users, database, external computing devices, and/or previous iterations of processing. As a non-limiting example, data conversion training data may include instructions from a user, who may be an expert user, a past user in embodiments disclosed herein, or the like, which may be stored in memory and/or stored in database, where the instructions may include labeling of training examples. In some embodiments, data conversion training data may be updated iteratively on a feedback loop. As a non-limiting example, processor 102 may update data conversion training data iteratively through a feedback loop as a function of input element 108, input attribute 118, or the like. In some embodiments, processor 102 may be configured to generate data converting machine-learning model 138. In a non-limiting example, generating data converting machine-learning model may include training, retraining, or fine-tuning data converting machine-learning model 138 using data conversion training data or updated data conversion training data. In some embodiments, processor 102 may be configured to convert input element 108 in first format 110 to second format 124 using data converting machine-learning model 138 (i.e. trained or updated data converting machine-learning model 138). In some embodiments, generating training data and training machine-learning models may be simultaneous.

With continued reference to FIG. 1, memory 104 contains instructions configuring processor 102 to generate output data 114 as a function of a plurality of input elements 108 in a second format 124. For the purposes of this disclosure, "output data" is data describing a value pertaining to input element. In some embodiments, output data 114 may include monetary value associated with input elements 108. As a non-limiting example, output data 114 may include monetary value that represents financial worth or charge assigned to each input element 108. As a non-limiting example, output data 114 may include monetary value that represents amount of money that a payor (e.g., an insurance company) can pay. In some embodiments, output data 114 may be retrieved from database. In some embodiments, user may manually input output data 114.

With continued reference to FIG. 1, generating output data 114 includes generating output training data 140, wherein the output training data 140 includes historical output data 142, training an output machine-learning model 128 using the output training data 140 and generating the output data 114 using the trained output machine-learning model 128. For the purposes of this disclosure, "output training data" is data containing correlations that a machine-learning process may use to model relationships between input elements and output data. For the purposes of this disclosure, an "output machine-learning model" a machine-learning model that generates output data. For the purposes of this disclosure, "historical output data" is collection of previous output data. As a non-limiting example, historical output data 142 may include previously generated output data. As another non-limiting example, historical output data 142 may include output data 114 that has been used or approved by a user or third party. In some embodiments, output training data 140 may be stored in database. In some embodiments, output training data 140 may be received from one or more users, database, external computing devices, and/or previous iterations of processing. As a non-limiting example, output training data 140 may include instructions from a user, who may be an expert user, a past user in embodiments disclosed herein, or the like, which may be stored in memory and/or stored in database, where the instructions may include labeling of training examples. In some embodiments, output training data 140 may be updated iteratively on a feedback loop. As a non-limiting example, processor 102 may update output training data 140 iteratively through a feedback loop as a function of input element 108, input attribute 118, output cohort 144, or the like. In a non-limiting example, generating output machine-learning model 128 may include training, retraining, or fine-tuning output machine-learning model 128 using output training data 140 or updated output training data 140. In some embodiments, processor 102 may be configured to generate output data 114 using output machine-learning model 128 (i.e. trained or updated output machine-learning model 128). In some embodiments, generating training data and training machine-learning models may be simultaneous.

With continued reference to FIG. 1, in some embodiments, generating output training data 140 may include generating cohort training data 146, wherein the cohort training data 146 may include exemplary input elements correlated to exemplary output cohorts, training a cohort classifier 148 using the cohort training data 146 and classifying a plurality of input elements 108 to one or more output cohorts 144 using the trained cohort classifier 148. For the purposes of this disclosure, an "output cohort" is a group or subset of data based on characteristics of a third party. As a non-limiting example, output cohort 144 may include one or more cohorts based on third party's size, preference, field, historical interactions or actions with previous output data or user-selected output data 112, and the like. For the purposes of this disclosure, "cohort training data" is data containing correlations that a machine-learning process may use to model relationships between input elements and output cohorts. For the purposes of this disclosure, a "cohort classifier" a classifier that classifies input elements to output cohorts. In some embodiments, generating the output training data 140 may include generating classification training data 150, wherein the classification training data 150 may include exemplary output cohorts correlated to exemplary training data, training a training data classifier 152 using the classification training data 150 and updating the output training data 140 as a function of the one or more output cohorts 144 using the training data classifier 152. For the purposes of this disclosure, "classification training data" is data containing correlations that a machine-learning process may use to model relationships between output cohorts correlated to training data. For the purposes of this disclosure, a "training data classifier" a classifier that classifies training data as a function of output cohorts. In some embodiments, input elements 108 or third party associated with input elements 108 (e.g., payor, insurance company, and the like) may be classified to output cohort 144 using a cohort classifier 148. Cohort classifier 148 may be consistent with any classifier discussed in this disclosure. Cohort classifier 148 may be trained on cohort training data 146, wherein the cohort training data 146 may include exemplary input element or exemplary third party correlated to exemplary output cohorts. In some embodiments, a input elements 108 or third party associated with input elements 108 may be classified to output cohort and processor 102 may generate output data 114 based on the output cohort using a machine-learning module and the resulting output may be used to update output training data 140 using training data classifier 152. In some embodiments, classification training data 150 and cohort training data 146 may be consistent with any training data described in this disclosure.

With continued reference to FIG. 1, in some cases, generating output data 114 may include using linear regression techniques. At least a processor 102 may be designed and configured to create a machine-learning model (e.g., output machine-learning model 128) using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, memory 104 contains instructions configuring processor 102 to update interactive data structure 106 as a function of output data 114. In some embodiments, interactive data structure 106 may include user-selected output data 112 associated with each of input elements 108 (e.g., previously inputted or generated values [output data 114]) associated with input elements 108 and processor 102 may update the values using output data 114. In some embodiments, generating output data 114 may include generating a user interface 154 displaying the output data 114 on a user device 116. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 102. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, user interface 154 may include an interactive graphical user interface 156. For the purposes of this disclosure, an "interactive graphical user interface" is an interface that facilitates engagement between a user and a system through graphical elements. As a non-limiting example, an interactive GUI 156 may include graphical elements such as buttons, icons, menus, sliders, or forms, which users can interact with to receive data, input data, modify displayed data, or initiate actions. In some embodiments, an interactive GUI 156 may enable data entry or selection activities. For instance, and without limitation, a user may allow to interact with graphical elements of interactive GUI 156. In some embodiments, interactive GUI 156 may be stored in a database, and a processor 102 may retrieve the interactive GUI 156 from the database. In some embodiments, users may manually customize or configure interactive GUI 156. Additional disclosure related to interactive graphical user interface 156 may be found in U.S. Nonprovisional patent application Ser. No. 18/958,334, filed on Nov. 25, 2024, and titled "APPARATUS AND METHOD FOR GENERATING AN INTERACTIVE GRAPHICAL USER INTERFACE," the entirety of which is incorporated as a reference.

With continued reference to FIG. 1, in some embodiments, generating output training data 140 may include receiving output feedback 158 for output data 114 and updating the output training data 140 as a function of the output feedback 158 by adding correlations between exemplary input elements and exemplary output data to historical output data 142. For the purposes of this disclosure, a "user feedback" is any data input associated with displayed output data by a user through a user interface. As a non-limiting example, output feedback 158 may include user's feedback related to projections (output data 114). For example, and without limitation, output feedback 158 may include feedback that a user accepts or rejects output data 114. For example, and without limitation, output feedback 158 may include user's modification of output data 114. In some embodiments, updating output training data 140 as a function of output feedback 158 may include adding, modifying or deleting correlations of exemplary input elements and exemplary output data as a function of output feedback 158.

With continued reference to FIG. 1, processor 102 may be configured to update output training data 140 using output feedback 158. Output machine-learning model 128 may use output feedback 158 to update its training data, thereby improving its performance, speed, and accuracy. In embodiments, output machine-learning model 128 may be iteratively updated using input and output results of past iterations of output machine-learning model 128. Output machine-learning model 128 may then be iteratively retrained using the updated output training data 140. For instance, and without limitation, output machine-learning model 128 may be trained using a first training data from, for example, and without limitation, training data from a output feedback 158 or database. Output machine-learning model 128 may then be updated by using previous inputs and outputs from output machine-learning model 128 as second set of training data to then retrain a newer iteration of output machine-learning model 128. This process of updating output machine-learning model 128 and its associated training data may be continuously done to create subsequent output machine-learning model 128 to improve the speed and accuracy of output machine-learning model 128. When users interact with the software, their actions, preferences, and feedback provide valuable information that can be used to refine and enhance the model. This output feedback 158 may be collected and incorporated into the training data, allowing the machine learning model to learn from real-world interactions and adapt its predictions accordingly. By continually incorporating output feedback 158, the model becomes more responsive to user needs and preferences, capturing evolving trends and patterns. This iterative process of updating the training data with output feedback 158 enables the machine learning model to deliver more personalized and relevant results, ultimately enhancing the overall user experience. The discussion within this paragraph may apply to both output machine-learning model 128 and any other machine-learning model/classifier discussed herein.

With continued reference to FIG. 1, incorporating output feedback 158 may include updating training data (e.g., output training data 140) by removing or adding correlations of input data and output data to a path or resources as indicated by output feedback 158. Any machine-learning model (e.g., output machine-learning model 128) as described herein may have the training data updated based on such feedback or data gathered using any method described herein. For example, when correlations in training data are based on outdated information, a web crawler may update such correlations based on more recent resources and information.

With continued reference to FIG. 1, processor 102 may use output feedback 158 to train machine-learning models and/or classifiers described above. For example, machine-learning models and/or classifiers may be trained using past inputs and outputs of the machine-learning model. In some embodiments, if output feedback 158 indicates that an output of machine-learning models and/or classifiers was "unfavorable," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, machine-learning models may be retrained with modified training data as described in further detail below. In some embodiments, training data of classifier may include output feedback 158.

Figure 2:
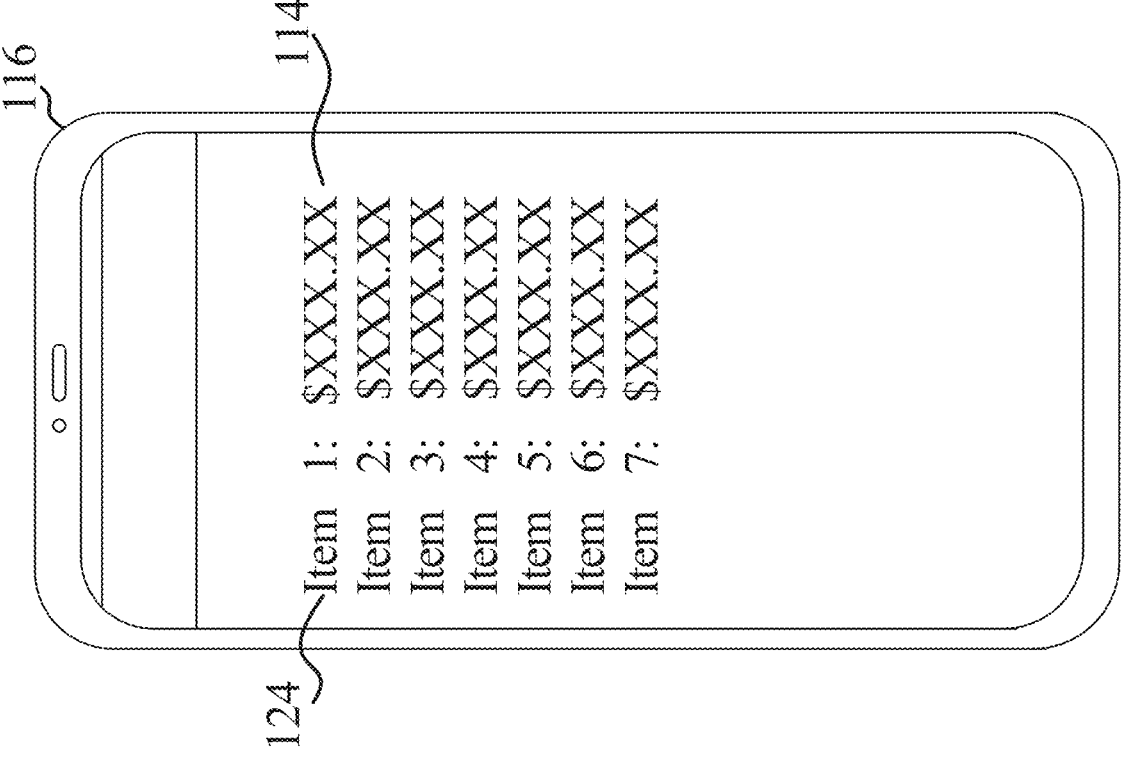
FIG. 2 illustrates an exemplary user interface displaying output data on a user device.
Figure 2:
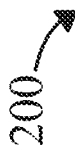

Referring now to FIG. 2, an exemplary user interface 200 displaying output data 114 on a user device 116. In some embodiments, user interface 200 may display input elements 108 in second format 124 and associated output data 114 generated for each of the input elements 108. In a non-limiting example, input elements 108 in second format 124 may include a list of items that are billable to a third party in an uniformed format and output data 114 may include price for each item of the list of items that can be billed to the third party. For example, in some embodiments, output data 114 may include pricing data for a chargemaster.

Figure 3:
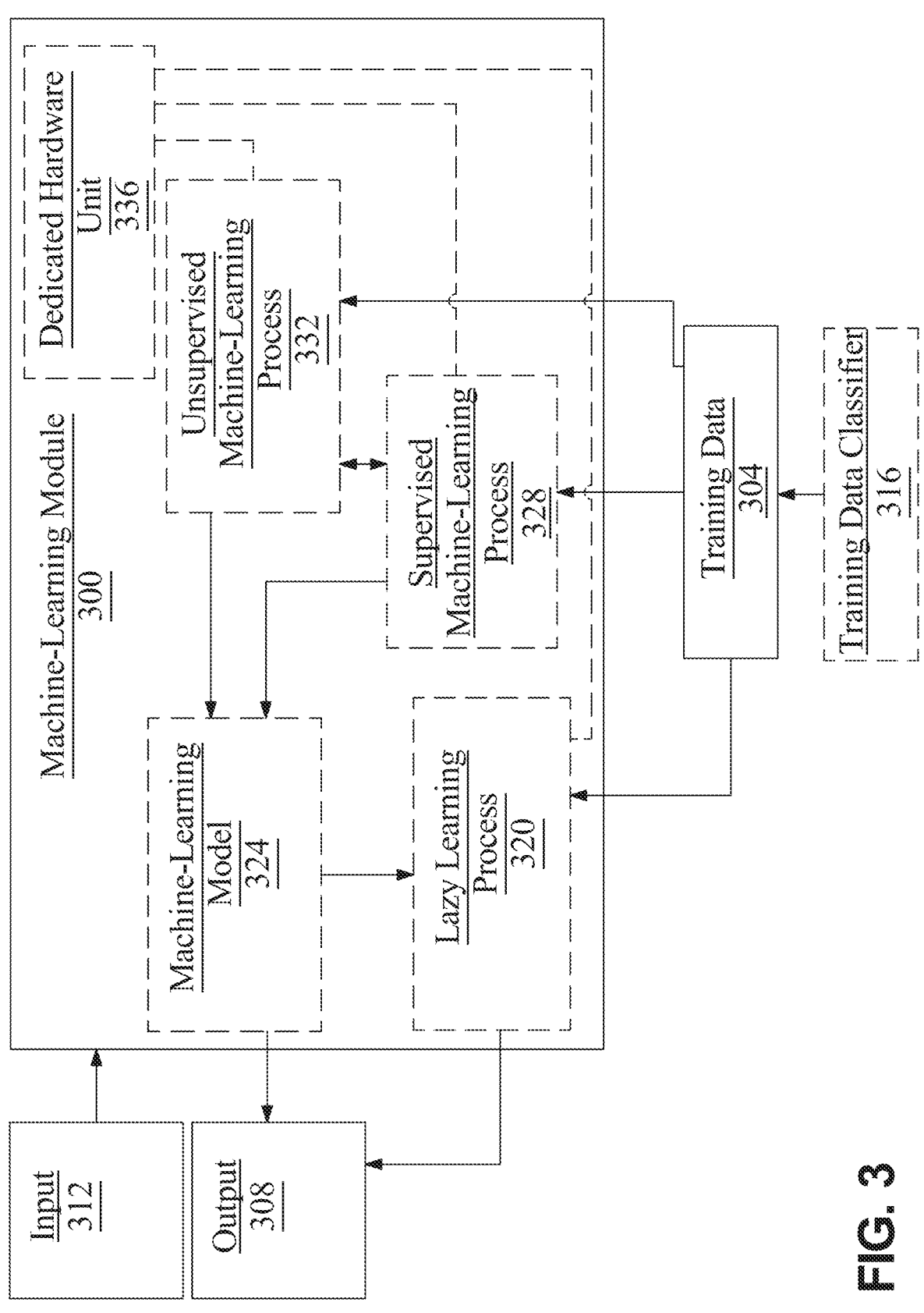
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include input elements 108, input attribute 118, and the like. As another non-limiting example, output data may include input attribute 118, output data 114, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to output cohorts 144; for instance, training data classifier 316 may classify elements of training data based third party's size, location, industry, preference, historical output data associated with third party, and the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels.

It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input elements 108, input attribute 118, and the like as described above as inputs, input attribute 118, output data 114, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
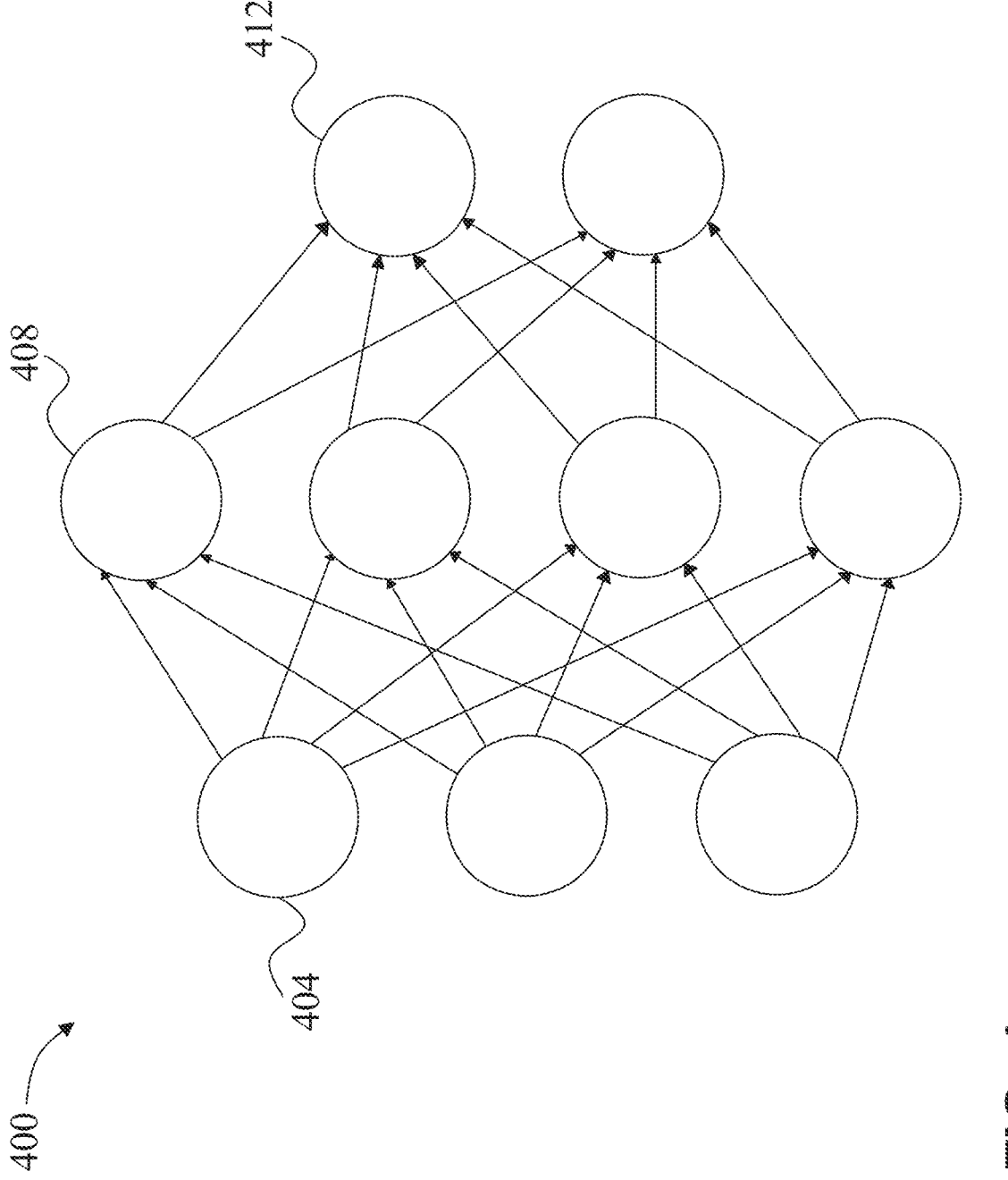
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
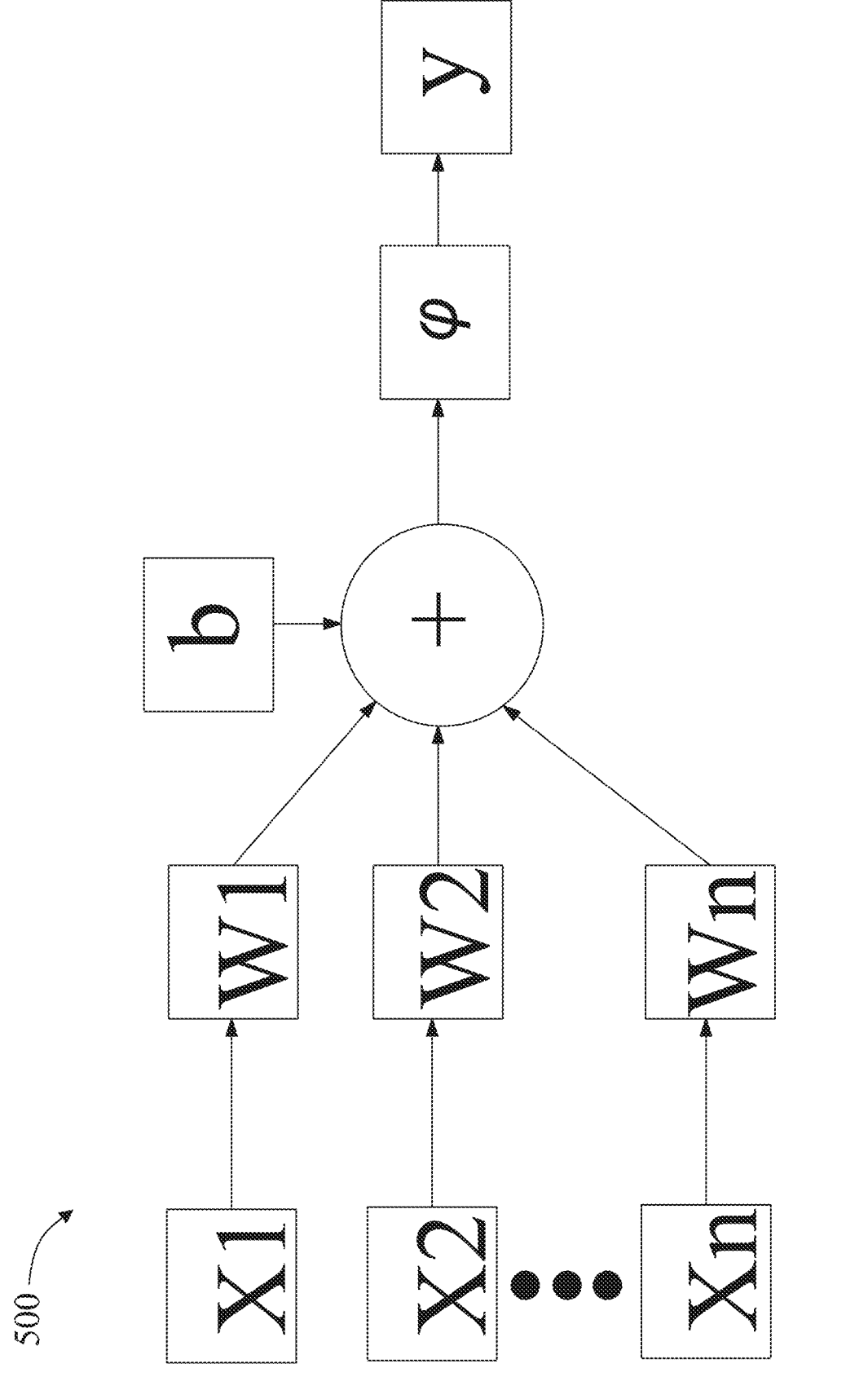
FIG. 5 illustrates a block diagram of an exemplary node in a neural network.

Referring now to FIG. 5 an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a \ (1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
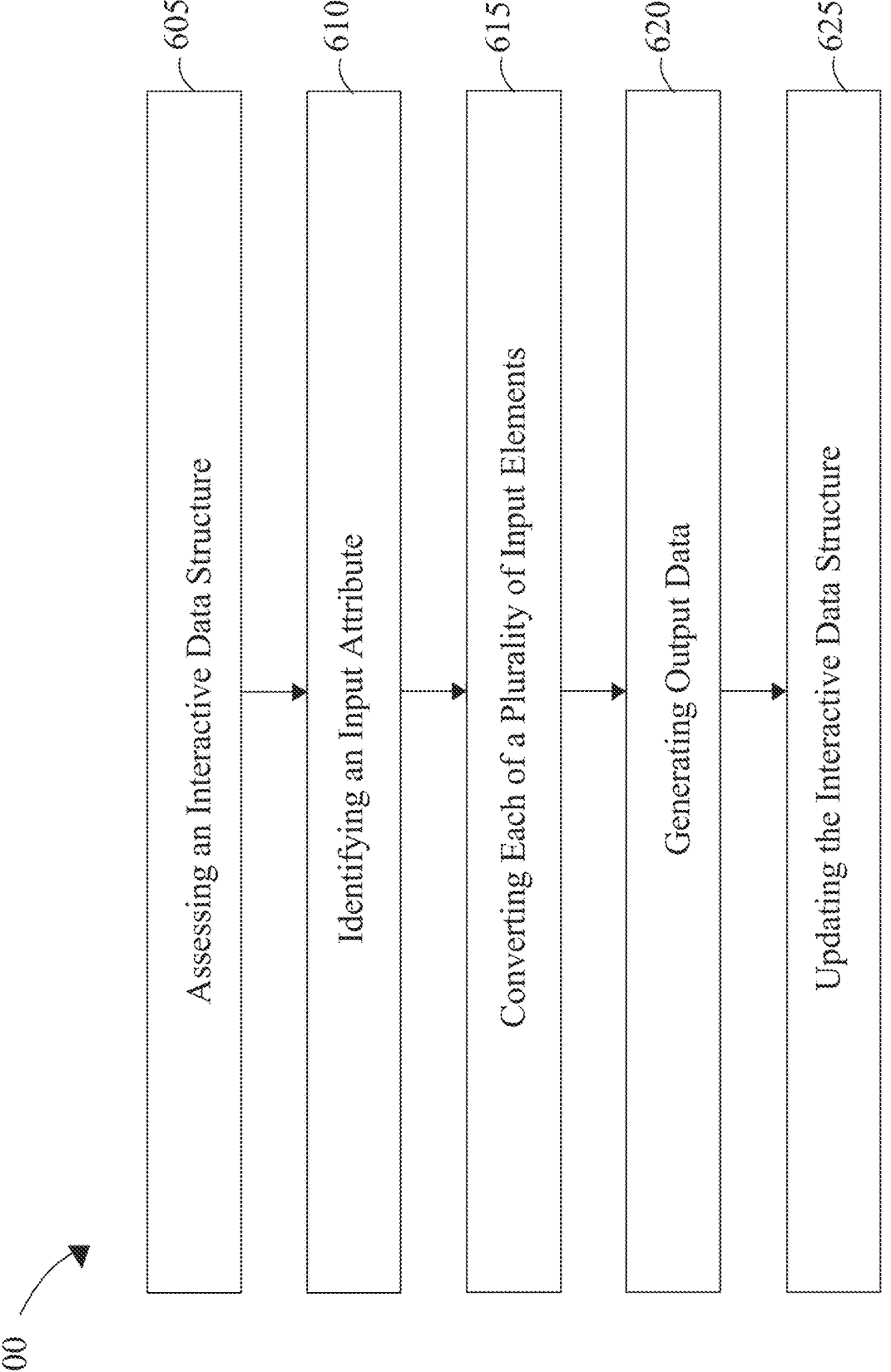
FIG. 6 illustrates a flow diagram of an exemplary method for adaptive data conversion.

Referring now to FIG. 6, a flow diagram of an exemplary method 600 for adaptive data conversion is disclosed. Method 600 contains a step 605 of accessing, using at least a processor, an interactive data structure including a plurality of input elements in a plurality of first formats. In some embodiments, the plurality of input elements may include user-selected output data associated with each of the plurality of input elements. These may be implemented as reference to FIGS. 1-5.

With continued reference to FIG. 6, method 600 contains a step 610 of identifying, using at least a processor, an input attribute of each of a plurality of input elements. In some embodiments, identifying the input attribute may include generating attribute training data, wherein the attribute training data may include exemplary input elements correlated to exemplary input attributes, training an attribute machine-learning model using the attribute training data and identifying the input attribute using the trained attribute machine-learning model. These may be implemented as reference to FIGS. 1-5.

With continued reference to FIG. 6, method 600 contains a step 615 of converting, using at least a processor, each of a plurality of input elements in a plurality of first formats to a second format as a function of an input attribute, wherein converting each of the plurality of input elements includes selecting one conversion pathway from a plurality of conversion pathways for each of the plurality of input elements as a function of the input attribute and the plurality of first formats, wherein the conversion pathway includes a format specific conversion sequence and converting the plurality of input elements using the selected conversion pathway. In some embodiments, the format specific conversion sequence may include a plurality of data converting machine-learning models, wherein a second data converting machine-learning model may receive an output of a first data converting machine-learning model as an input. In some embodiments, the format specific conversion sequence may include an optical character recognition and a large language model, wherein the large language model may receive an output of the optical character recognition as an input. In some embodiments, the format specific conversion sequence may include an encoder. These may be implemented as reference to FIGS. 1-5.

With continued reference to FIG. 6, method 600 contains a step 620 of generating, using at least a processor, output data as a function of a plurality of input elements in a second format, wherein generating the output data includes generating output training data, wherein the output training data comprises historical output data, training an output machine-learning model using the output training data and generating the output data using the trained output machine-learning model. In some embodiments, generating the output training data may include generating cohort training data, wherein the cohort training data may include exemplary input elements correlated to exemplary output cohorts, training a cohort classifier using the cohort training data and classifying the plurality of input elements to one or more output cohorts using the trained cohort classifier. In some embodiments, generating the output training data may include generating classification training data, wherein the classification training data may include exemplary output cohorts correlated to exemplary training data, training a training data classifier using the classification training data and updating the output training data as a function of the one or more output cohorts using the training data classifier. In some embodiments, generating the output data may include generating a user interface displaying the output data on a user device. In some embodiments, generating the output training data may include receiving output feedback for the output data and updating the output training data as a function of the output feedback by adding correlations between exemplary input elements and exemplary output data to the historical output data. These may be implemented as reference to FIGS. 1-5.

With continued reference to FIG. 6, method 600 contains a step 625 of updating, using at least a processor, an interactive data structure as a function of output data. This may be implemented as reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
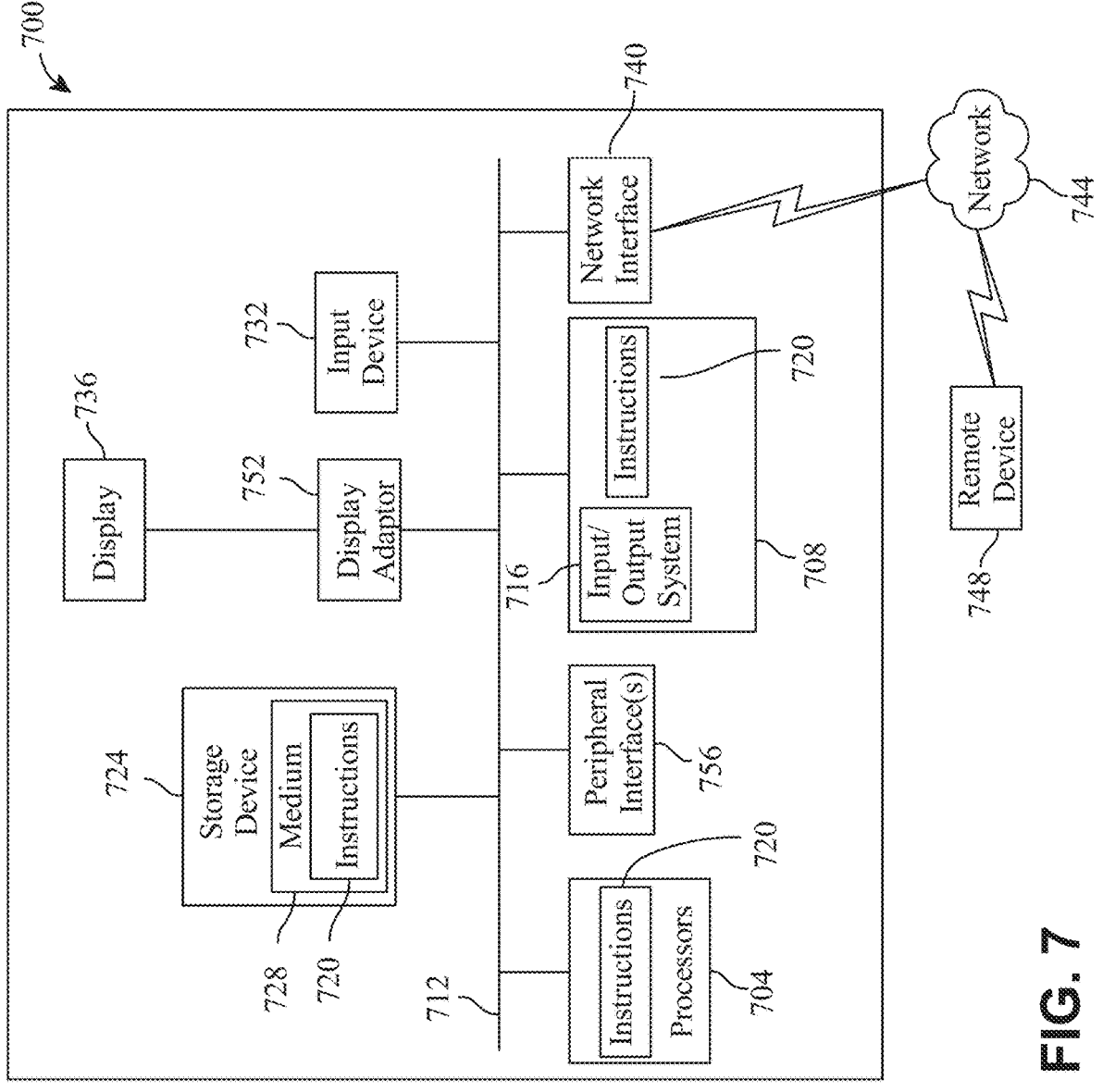
FIG. 7 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and memory 708 that communicate with each other, and with other components, via a bus 712. Bus 712 may include any of several types of bus structures including, but not limited to, memory bus, memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for adaptive data conversion, the apparatus comprising:

at least a processor; and a memory communicatively connected to the at least a processor, wherein the memory contains instructions configuring the at least a processor to:

access an interactive data structure comprising a plurality of input elements in a plurality of first formats, wherein the plurality of input elements comprises user-selected output data associated with each of the plurality of input elements, wherein at least one input element of the plurality of input elements comprises an image of a billable charge from a medical facility and information on the medical facility;

identify an input attribute of each of the plurality of input elements utilizing an attribute machine-learning model which comprises:

receiving attribute training data, wherein the attribute training data correlates a plurality of exemplary input element data to a plurality of exemplary input attribute data;

training the attribute machine-learning model using the attribute training data; and identifying the input attribute using the trained attribute machine-learning model, wherein the input attribute for the at least one input element comprises an image-based attribute identifying a diagnostic category of the billable charge;

convert each of the plurality of input elements in the plurality of first formats to a second format as a function of the input attribute, wherein converting each of the plurality of input elements comprises:

selecting one conversion pathway from a plurality of conversion pathways for each of the plurality of input elements as a function of the input attribute and the plurality of first formats, wherein the conversion pathway comprises a format specific conversion sequence; and converting the plurality of input elements using the selected conversion pathway, wherein the format specific conversion sequence comprises an optical character recognition (OCR) to convert at least the image of the billable charge from the medical facility and the information on the medical facility of the plurality of input elements into machine-encoded text, wherein converting at least the image of the billable charge from the medical facility and the information on the medical facility of the plurality of input elements into the machine-encoded text comprises converting an image of text in at least the image of the billable charge from the medical facility and the information on the medical facility of the plurality of input elements into the machine-encoded text and further comprises:

pre-processing image components of the image of text by de-skewing at least one of the image components by applying a transform operation to the at least one of the image components; and implementing an OCR algorithm comprising a matrix matching process by comparing pixels of at least one of the pre-processed images components to pixels of a stored glyph on a pixel-by-pixel basis;

generate output data as a function of the converted plurality of input elements, including at least the text-converted image of the billable charge from the medical facility and the information on the medical facility of the plurality of input elements converted into the machine-encoded text by the OCR, in the second format as converted by at least the OCR, wherein generating the output data comprises:

generating output training data, wherein the output training data comprises historical output data;

training an output machine-learning model using the output training data; and generating the output data using the trained output machine-learning model, wherein the output data comprises a monetary value that represents an amount payable by an insurance company to the medical facility based on the billable charge from the medical facility and the identification of the diagnostic category of the billable charge; and update the interactive data structure as a function of the output data.

2. The apparatus of claim 1, wherein the format specific conversion sequence comprises a plurality of data converting machine-learning models, wherein a second data converting machine-learning model receives an output of a first data converting machine-learning model as an input.

3. The apparatus of claim 1, wherein the format specific conversion sequence comprises the OCR and a large language model, wherein the large language model receives an output of the OCR as an input.

4. The apparatus of claim 1, wherein the format specific conversion sequence comprises an encoder.

5. The apparatus of claim 1, wherein generating the output training data comprises:

generating cohort training data, wherein the cohort training data comprises exemplary input elements correlated to exemplary output cohorts;

training a cohort classifier using the cohort training data; and classifying the plurality of input elements to one or more output cohorts using the trained cohort classifier.

6. The apparatus of claim 5, wherein generating the output training data comprises:

generating classification training data, wherein the classification training data comprises exemplary output cohorts correlated to exemplary training data;

training a training data classifier using the classification training data; and updating the output training data as a function of the one or more output cohorts using the training data classifier.

7. The apparatus of claim 1, wherein generating the output data comprises generating a user interface displaying the output data on a user device.

8. The apparatus of claim 7, wherein generating the output training data comprises:

receiving output feedback for the output data; and updating the output training data as a function of the output feedback by adding correlations between exemplary input elements and exemplary output data to the historical output data.

9. A method for adaptive data conversion, the method comprising:

accessing, using at least a processor, an interactive data structure comprising a plurality of input elements in a plurality of first formats, wherein the plurality of input elements comprises user-selected output data associated with each of the plurality of input elements, wherein at least one input element of the plurality of input elements comprises an image of a billable charge from a medical facility and information on the medical facility;

identifying, using the at least a processor, an input attribute of each of the plurality of input elements utilizing an attribute machine-learning model which comprises:

receiving attribute training data, wherein the attribute training data correlates a plurality of exemplary input element data to a plurality of exemplary input attribute data;

training the attribute machine-learning model using the attribute training data; and identifying the input attribute using the trained attribute machine-learning model, wherein the input attribute for the at least one input element comprises an image-based attribute identifying a diagnostic category of the billable charge;

converting, using the at least a processor, each of the plurality of input elements in the plurality of first formats to a second format as a function of the input attribute, wherein converting each of the plurality of input elements comprises:

selecting one conversion pathway from a plurality of conversion pathways for each of the plurality of input elements as a function of the input attribute and the plurality of first formats, wherein the conversion pathway comprises a format specific conversion sequence; and converting the plurality of input elements using the selected conversion pathway, wherein the format specific conversion sequence comprises an optical character recognition (OCR) to convert at least the image of the billable charge from the medical facility and the information on the medical facility of the plurality of input elements into machine-encoded text, wherein converting at least the image of the billable charge from the medical facility and the information on the medical facility of the plurality of input elements into the machine-encoded text comprises converting an image of text in at least the image of the billable charge from the medical facility and the information on the medical facility of the plurality of input elements into the machine-encoded text and further comprises:

pre-processing image components of the image of text by de-skewing at least one of the image components by applying a transform operation to the at least one of the image components; and implementing an OCR algorithm comprising a matrix matching process by comparing pixels of at least one of the pre-processed images components to pixels of a stored glyph on a pixel-by-pixel basis;

generating, using the at least a processor, output data as a function of the converted plurality of input elements, including at least the text-converted image of the billable charge from the medical facility and the information on the medical facility of the plurality of input elements converted into the machine-encoded text by the OCR, in the second format as converted by at least the OCR, wherein generating the output data comprises:

generating output training data, wherein the output training data comprises historical output data;

training an output machine-learning model using the output training data; and generating the output data using the trained output machine-learning model, wherein the output data comprises a monetary value that represents an amount payable by an insurance company to the medical facility based on the billable charge from the medical facility and the identification of the diagnostic category of the billable charge; and updating, using the at least a processor, the interactive data structure as a function of the output data.

10. The method of claim 9, wherein the format specific conversion sequence comprises a plurality of data converting machine-learning models, wherein a second data converting machine-learning model receives an output of a first data converting machine-learning model as an input.

11. The method of claim 9, wherein the format specific conversion sequence comprises the OCR and a large language model, wherein the large language model receives an output of the OCR as an input.

12. The method of claim 9, wherein the format specific conversion sequence comprises an encoder.

13. The method of claim 9, wherein generating the output training data comprises:

generating cohort training data, wherein the cohort training data comprises exemplary input elements correlated to exemplary output cohorts;

training a cohort classifier using the cohort training data; and classifying the plurality of input elements to one or more output cohorts using the trained cohort classifier.

14. The method of claim 13, wherein generating the output training data comprises:

generating classification training data, wherein the classification training data comprises exemplary output cohorts correlated to exemplary training data;

training a training data classifier using the classification training data; and updating the output training data as a function of the one or more output cohorts using the training data classifier.

15. The method of claim 9, wherein generating the output data comprises generating a user interface displaying the output data on a user device.

16. The method of claim 15, wherein generating the output training data comprises:

receiving output feedback for the output data; and updating the output training data as a function of the output feedback by adding correlations between exemplary input elements and exemplary output data to the historical output data.

* * * * *